(12) United States Patent
Chen et al.

(10) Patent No.: US 8,049,936 B2
(45) Date of Patent: Nov. 1, 2011

(54) PORTABLE COMPUTER SYSTEM AND OPERATING METHOD THEREOF

(75) Inventors: Hsu-Hung Chen, Sanchong (TW);
Tung-Lin Hsieh, Jhongli (TW);
Hsin-Hung Lee, Fongshan (TW);
Yao-Shun Tseng, Nantou (TW)

(73) Assignee: Quanta Computer Inc., Tao Yuan Shien (TW)

( * ) Notice: Subject to any disclaimer, the term of this patent is extended or adjusted under 35 U.S.C. 154(b) by 886 days.

(21) Appl. No.: 12/073,947

(22) Filed: Mar. 12, 2008

(65) Prior Publication Data
US 2009/0091803 A1   Apr. 9, 2009

(30) Foreign Application Priority Data
Oct. 9, 2007  (TW) .............................. 96137760 A (51) Int. Cl.
*H04N 1/04* (2006.01)

(52) U.S. Cl. ......... 358/474; 358/475; 358/471; 358/484
(58) Field of Classification Search .................. 358/474, 358/475, 471, 484, 487, 505
See application file for complete search history.

(56) References Cited

U.S. PATENT DOCUMENTS

| | | | |
|---|---|---|---|
| 7,362,478 B2 * | 4/2008 | Mangerson | 358/474 |
| 7,477,424 B2 * | 1/2009 | Wang et al. | 358/474 |
| 7,751,092 B2 * | 7/2010 | Sambongi et al. | 358/474 |
| 2008/0151099 A1 * | 6/2008 | Lin et al. | 348/376 |
| 2008/0279454 A1 * | 11/2008 | Lev et al. | 382/181 |

FOREIGN PATENT DOCUMENTS

| | | | |
|---|---|---|---|
| CN | 1722054 | * | 1/2006 |
| CN | 1862445 | | 11/2006 |
| CN | 1321358 | | 6/2007 |
| TW | 439023 | | 6/2001 |
| TW | 559422 | | 10/2003 |
| TW | I266225 | | 11/2006 |
| TW | M313388 | | 6/2007 |

OTHER PUBLICATIONS

English language translation of abstract of CN 1321358.
English language translation of abstract of CN 1862445.
English language translation of abstract of TW 439023 (published Jun. 7, 2006).
English language translation of abstract of TW 559422 (published Oct. 21, 2003).
English language translation of abstract of TW I266225 (published Nov. 11, 2006).
English language translation of abstract of TW M313388 (published Jun. 1, 2007).

* cited by examiner

*Primary Examiner* — Houshang Safaipour
(74) *Attorney, Agent, or Firm* — Thomas, Kayden, Horstemeyer & Risley, LLP (57) ABSTRACT

The invention provides a portable computer system for capturing a target image related to an item. The portable computer system comprises a base, a cover, an image capturing module, and a lightness adjusting module. The cover is pivotally connected to the base, and comprises a panel. According to the size of the item, the cover rotates with respect to the base to project the light radiated from the panel onto the base. The image capturing module is used for rotating with respect to the cover to capture a reference image according to the size of the item. The lightness adjusting module is used for adjusting the lightness of the panel according to the reference image. After the lightness of the panel is adjusted, the item is deposed on the base, and the image capturing module captures the target image related to the item.

9 Claims, 8 Drawing Sheets

Threshold: 9

| | Effective lighting region | | | | Reference image | | | | | Difference | | | | Lightness adjustment | | | |
|---|---|---|---|---|---|---|---|---|---|---|---|---|---|---|---|---|---|
| (1) | 200 | 200 | 200 | 200 | 210 | 215 | 215 | 210 | | 20 | 25 | 25 | 20 | -10 | -10 | -10 | -10 |
| | 200 | 200 | 200 | 200 | 210 | 190 | 190 | 210 | | 20 | 0 | 0 | 20 | -10 | 0 | 0 | -10 |
| | 200 | 200 | 200 | 200 | 210 | 180 | 180 | 210 | Middle | 20 | -10 | -10 | 20 | -10 | 10 | 10 | -10 |
| | 200 | 200 | 200 | 200 | 210 | 210 | 210 | 210 | number 190 | 20 | 20 | 20 | 20 | -10 | -10 | -10 | -10 |
| (2) | 190 | 190 | 190 | 190 | 199 | 207 | 207 | 199 | | -4 | 4 | 4 | -4 | 0 | 0 | 0 | 0 |
| | 190 | 200 | 200 | 190 | 203 | 188 | 188 | 204 | | 0 | -15 | -15 | 1 | 0 | 10 | 10 | 0 |
| | 190 | 210 | 210 | 190 | 205 | 181 | 181 | 205 | Middle | 2 | -23 | -23 | 2 | 0 | 10 | 10 | 0 |
| | 190 | 190 | 190 | 190 | 207 | 206 | 206 | 206 | number 203 | 4 | 3 | 3 | 3 | 0 | 0 | 0 | 0 |
| (3) | 190 | 190 | 190 | 190 | 202 | 209 | 209 | 202 | | -3 | 4 | 4 | -3 | 0 | 0 | 0 | 0 |
| | 190 | 210 | 210 | 190 | 205 | 195 | 195 | 206 | | 0 | -11 | -11 | 1 | 0 | 10 | 10 | 0 |
| | 190 | 220 | 220 | 190 | 205 | 181 | 181 | 205 | Middle | 2 | -19 | -19 | 2 | 0 | 10 | 10 | 0 |
| | 190 | 190 | 190 | 190 | 207 | 206 | 206 | 206 | number 205 | 3 | 3 | 3 | 2 | 0 | 0 | 0 | 0 |
| (4) | 190 | 190 | 190 | 190 | 205 | 211 | 211 | 205 | | -2 | 4 | 4 | -2 | 0 | 0 | 0 | 0 |
| | 190 | 220 | 220 | 190 | 207 | 201 | 201 | 208 | | 0 | -6 | -6 | 1 | 0 | 0 | 0 | 0 |
| | 190 | 230 | 230 | 190 | 209 | 192 | 192 | 209 | Middle | 2 | -16 | -16 | 2 | 0 | 10 | 10 | 0 |
| | 190 | 190 | 190 | 190 | 209 | 209 | 209 | 208 | number 207 | 2 | 2 | 2 | 1 | 0 | 0 | 0 | 0 |
| (5) | 190 | 190 | 190 | 190 | 205 | 211 | 211 | 205 | | -3 | 3 | 3 | -3 | 0 | 0 | 0 | 0 |
| | 190 | 220 | 220 | 190 | 208 | 203 | 203 | 209 | | 0 | -6 | -6 | 1 | 0 | 0 | 0 | 0 |
| | 190 | 240 | 240 | 190 | 210 | 196 | 196 | 210 | Middle | 2 | -13 | -13 | 2 | 0 | 10 | 10 | 0 |
| | 190 | 190 | 190 | 190 | 210 | 211 | 211 | 209 | number 208 | 2 | 3 | 3 | 1 | 0 | 0 | 0 | 0 |
| (6) | 190 | 190 | 190 | 190 | 205 | 211 | 211 | 205 | | -4 | 2 | 2 | -4 | 0 | 0 | 0 | 0 |
| | 190 | 220 | 220 | 190 | 209 | 204 | 204 | 210 | | 0 | -5 | -5 | 1 | 0 | 0 | 0 | 0 |
| | 190 | 250 | 250 | 190 | 211 | 200 | 200 | 211 | Middle | 2 | -10 | -10 | 2 | 0 | 10 | 10 | 0 |
| | 190 | 190 | 190 | 190 | 211 | 212 | 212 | 210 | number 209 | 2 | 2 | 2 | 1 | 0 | 0 | 0 | 0 |
| (7) | 190 | 190 | 190 | 190 | 205 | 211 | 211 | 205 | | -4 | 2 | 2 | -4 | 0 | 0 | 0 | 0 |
| | 190 | 220 | 220 | 190 | 210 | 206 | 206 | 211 | | 1 | -4 | -4 | 2 | 0 | 0 | 0 | 0 |
| | 190 | 260 | 260 | 190 | 212 | 204 | 204 | 212 | Middle | 3 | -6 | -6 | 3 | 0 | 0 | 0 | 0 |
| | 190 | 190 | 190 | 190 | 212 | 214 | 214 | 211 | number 210 | 3 | 5 | 5 | 2 | 0 | 0 | 0 | 0 |

PORTABLE COMPUTER SYSTEM AND OPERATING METHOD THEREOF

BACKGROUND OF THE INVENTION

1. Field of the Invention

The invention relates to a portable computer system and the operating method thereof, and particularly, to a portable computer system with the functions of scanning and/or copying and the operating method thereof.

2. Description of the Prior Art

In recent years, because the image processing technology has been continually progressing, there have been various image input/output apparatuses with different functions shown in the market. For example, the image input/output apparatus can be a scanner, a printer, a copier, or an all-in-one printer. These image input/output apparatuses can not only help a user to scan or copy the image but also provide much convenience to the user's daily life.

In general, if a user wants to convert a figure or a texture shown in the document into an image file stored in the computer, a scanner is needed to scan the figure or the texture into the computer. And, if a user wants to copy a figure or a texture shown in the document, a copier can be directly used to perform the copy function. In addition, the figure or the texture shown in the document can be converted into an image file by a scanner firstly, and then the image file is printed by a printer.

However, in the above-mentioned scanning or copying methods, the image input/output apparatus such as a scanner or a copier is needed to perform the scanning or copying function. It is quite inconvenient for the modern users who place importance on the size of the electronic product and the convenience for use.

Therefore, the invention provides a portable computer system with a scanning and/or copying function and the operating method thereof to solve the above mentioned problems.

SUMMARY OF THE INVENTION

The invention provides a portable computer system with a scanning and/or copying function and the operating method thereof. According to an embodiment, the portable computer system of the invention is used for capturing a target image related to an item.

In this embodiment, the portable computer system includes a base, a cover, an image capturing module, and a lightness adjusting module. The cover is pivotally connected to the base, and includes a panel projecting the light onto the base and rotating according to the size of the item. The cover can rotate according to the size of the item. The panel projects the light onto the base. The image capturing module is pivotally connected to the cover. The image capturing module rotates with respect to the cover to capture a reference image according to the size of the item. The lightness adjusting module is used for adjusting the lightness of the panel according to the reference image. The image capturing module captures the target image related to the item after the lightness of the panel is adjusted.

When a user wants to scan or copy an item, the following steps are performed to operate the above-mentioned portable computer system. Firstly, the cover is rotated with respect to the base to project the light radiated from the panel onto the base according to the size of the item. Then, the image capturing module is rotated with respect to the cover to capture a reference image according to the size of the item. Afterward, the lightness of the panel is adjusted according to the reference image, and then the item is deposed on the base after the lightness of the panel is adjusted. At last, the target image related to the item is captured.

By doing so, it is unnecessary to add extra scanning apparatuses to capture an image quickly. At the same time, the captured image can be converted into an image file, and the image file can be stored in the portable computer system. Besides, if the portable computer system further cooperates with a printer, the function of copying the image can be achieved.

The advantage and spirit of the invention may be understood by the following recitations together with the appended drawings.

BRIEF DESCRIPTION OF THE APPENDED DRAWINGS

FIG. 4 shows an example of light source adjusting process.

DETAILED DESCRIPTION OF THE INVENTION

Figure 1A:
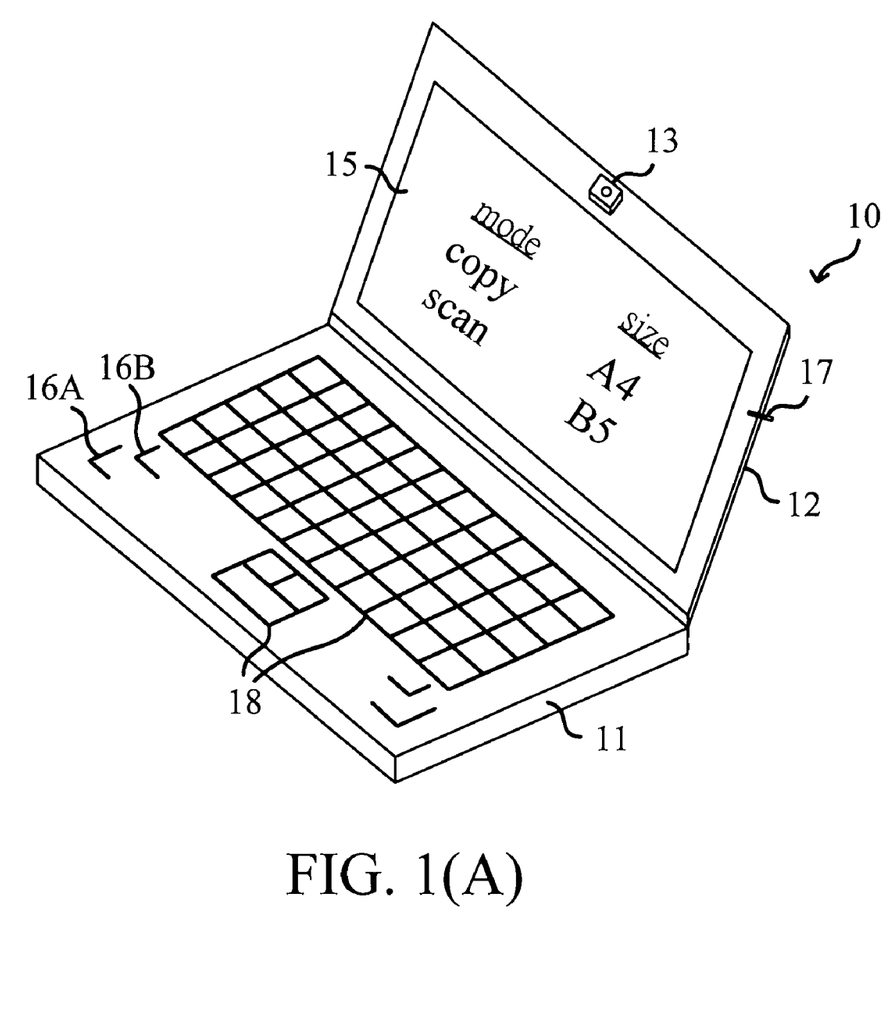
FIG. 1(A) shows a schematic diagram of the portable computer system in the first embodiment according to the invention.
Figure 1B:
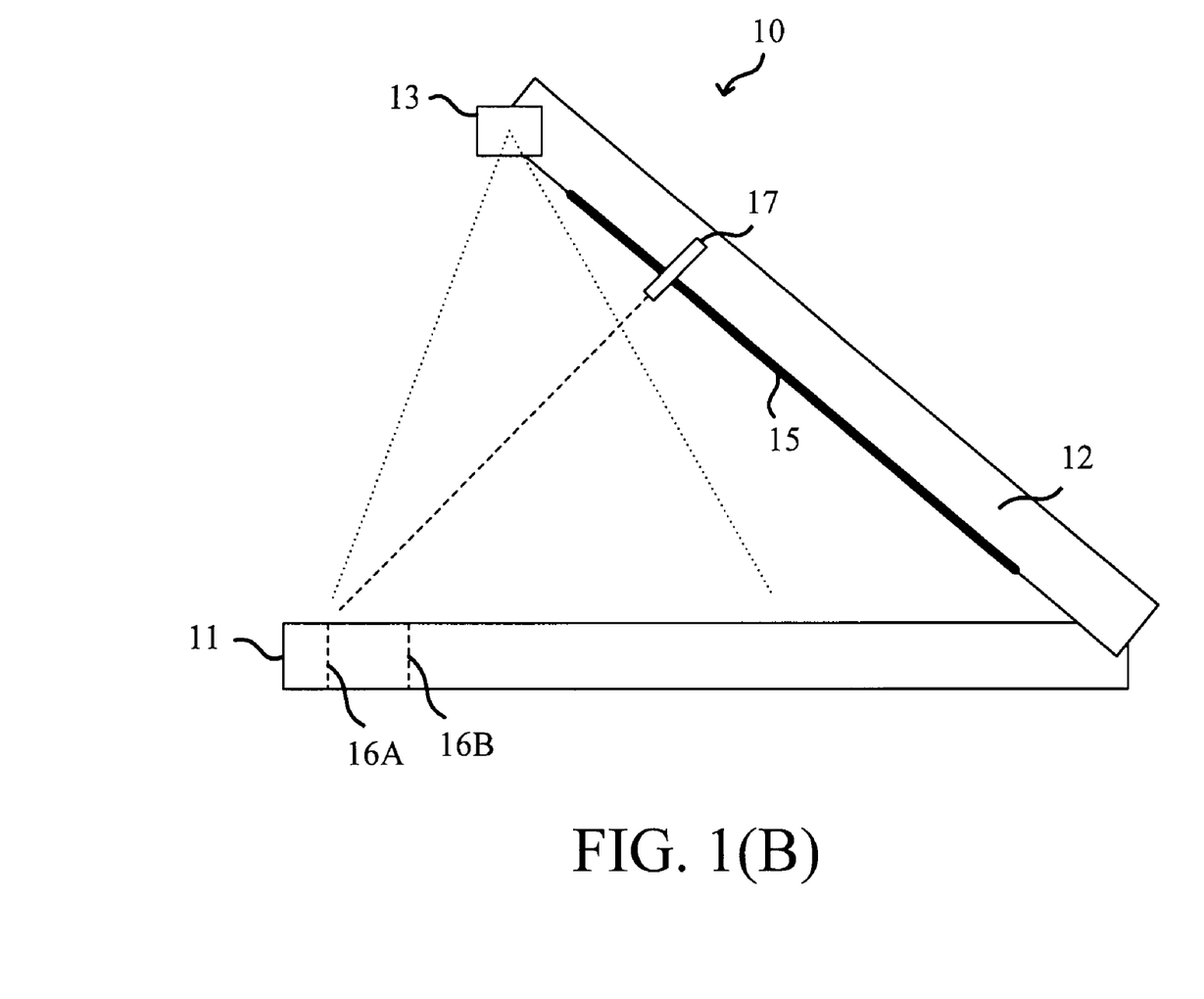
FIG. 1(B) shows the lateral view of the portable computer system shown in FIG. 1(A).
Figure 1C:
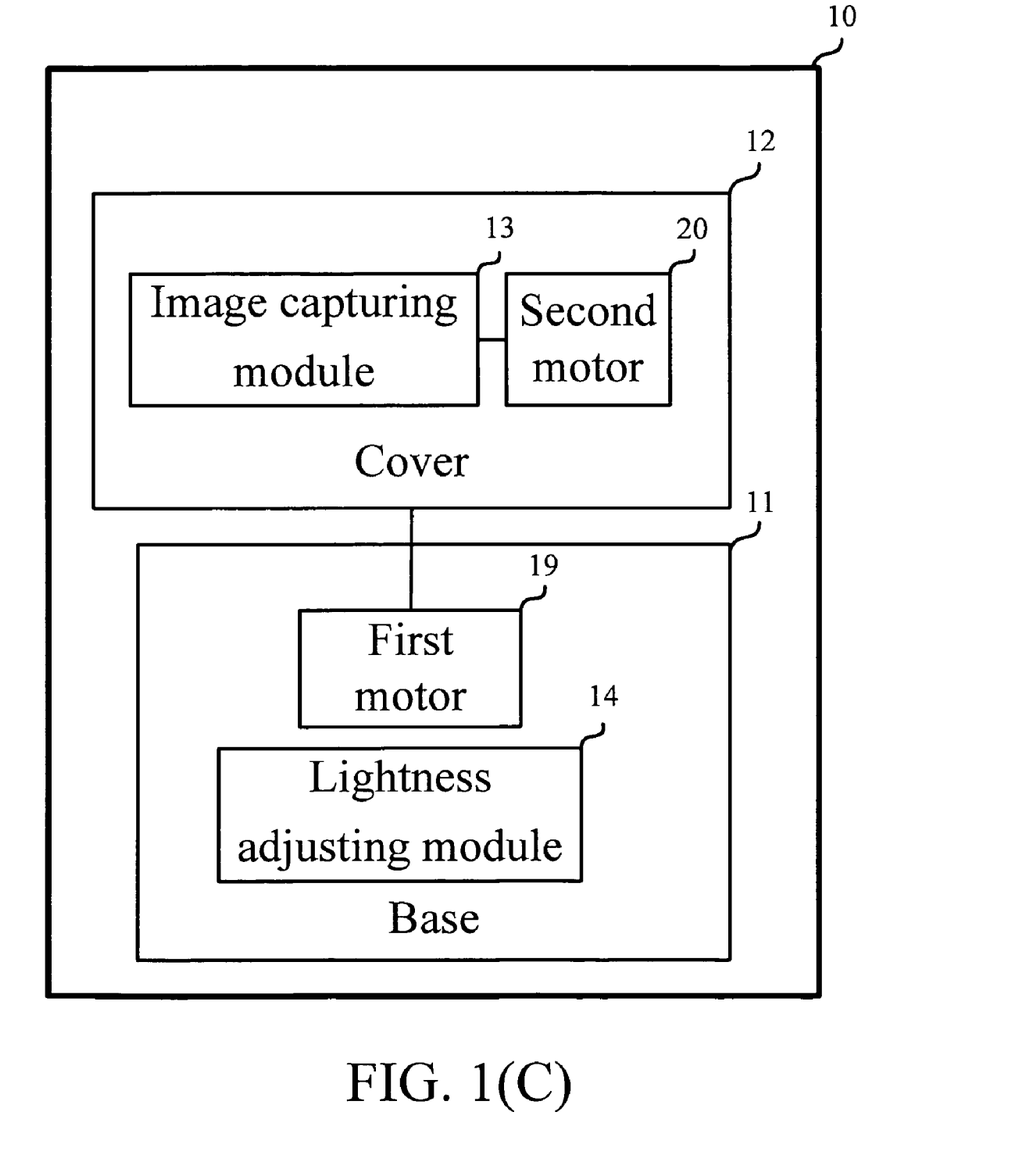
FIG. 1(C) shows the functional block diagram of the portable computer system shown in FIG. 1(A).

The first embodiment according to the invention is a portable computer system. The portable computer system is used for capturing a target image related to an item. Please refer to FIG. 1(A) to FIG. 1(C). FIG. 1(A) shows a schematic diagram of the portable computer system 10. FIG. 1(B) shows the lateral view of the portable computer system 10 shown in FIG. 1(A). FIG. 1(C) shows the functional block diagram of the portable computer system 10 shown in FIG. 1(A). In an embodiment according to the invention, the portable computer system 10 is used for capturing a target image related to an item such as a document or a picture.

The portable computer system 10 includes a base 11, a cover 12, an image capturing module 13, and a lightness adjusting module 14. The cover 12 is pivotally connected to the base 11. The cover 12 comprises a panel 15 projecting the light onto the base 11 and rotates according to the size of the item. The image capturing module 13 is pivotally connected to the cover 12. The image capturing module 13 rotates with respect to the cover 12 to capture a reference image according to the size of the item. The lightness adjusting module 14 is used for adjusting the lightness of the panel 15 according to the reference image. After the lightness of the panel 15 is adjusted, the item is disposed on the base 11. Then, the image capturing module 13 captures the target image related to the item after the lightness of the panel 15 is adjusted.

In practical applications, the base 11 can include an input module 18. The input module 18 can be used for inputting or selecting an operating mode and the size of the item. As shown in FIG. 1(A), the operating mode can be a scan mode or a copy mode. The size of the item can be a general document specification, such as an A3 size, an A4 size, or a B5 size. For example, if a user wants to scan a document of an A4 size, he/she can input or select the scan mode and the A4 size through the input module 18. In addition, the panel 15 can be a touch panel, and the user can directly select the operating mode and the size of the item on the panel 15.

The base includes at least one positioning mark corresponding to the size of the item. As shown in FIGS. 1, 16A and 16B are positioning marks corresponding to the two different item sizes. That is to say, the positioning lines corresponding to different item sizes can be marked on the base 11 in advance. When the user wants to scan or copy the document, the only thing he/she needs to do is to depose the document inside the positioning line corresponding to the size of the document. It is unnecessary to further adjust the position of the document.

As shown in FIG. 1, the portable computer system 10 can further include an indicator 17. The indicator 17 is deposed on the cover 12 and emits an indicating light. During the rotating of the cover 12, if the indicating light radiated from the indicator 17 is projected onto the positioning mark, the cover 12 stops rotating. For example, the indicator 17 can be a laser emitter. And, the positioning marks corresponding to different item sizes have been marked in advance. Therefore, when the laser is projected onto the positioning mark corresponding to the item size to be copied or scanned, it means the cover 12 has rotated onto the correct position, as shown in FIG. 1(B).

In practical applications, the portable computer system 10 can further include a first motor 19 and a second motor 20. The first motor 19 is connected to the cover 12 and is used for actuating the cover 12 to rotate. The second motor 20 is connected to the image capturing module 13 and is used for actuating the image capturing module 13 to rotate. The first motor 19 and the second motor 20 can be a step motor, and can let the cover 12 and the image capturing module 13 reach the angle to be rotated by stepping the steps corresponding to the angle to be rotated. For example, after the operating mode and the item size are selected by the user, the first motor 19 and the second motor 20 will automatically actuate the cover 12 and the image capturing module 13 to rotate to the corresponding position.

In addition, the image capturing module 13 can be a camera or a video camera. The image capturing module 13 can have a calibrator, and the size of the item corresponds to the calibrator. That is to say, after the item size is selected by the user, the calibrator of the image capturing module 13 can be manually adjusted to correspond to the item size.

Figure 2:
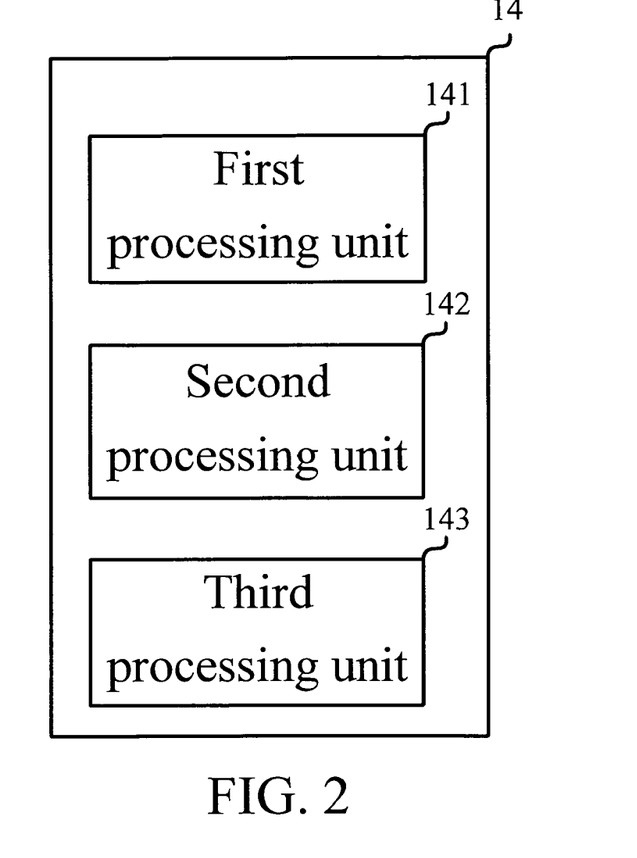
FIG. 2 shows the functional block diagram of the lightness adjusting module shown in FIG. 1(C).

Please refer to FIG. 2. FIG. 2 shows the functional block diagram of the lightness adjusting module 14 shown in FIG. 1(C). In practical applications, the lightness adjusting module 14 can further include a first processing unit 141, a second processing unit 142, and a third processing unit 143. The first processing unit 141 is used for calculating an effective lighting region of the panel 15 according to the size of the item and dividing the effective lighting region into N first sub-regions. N is a positive integer. Each of the N first sub-regions has a default lightness respectively.

Figure 3:
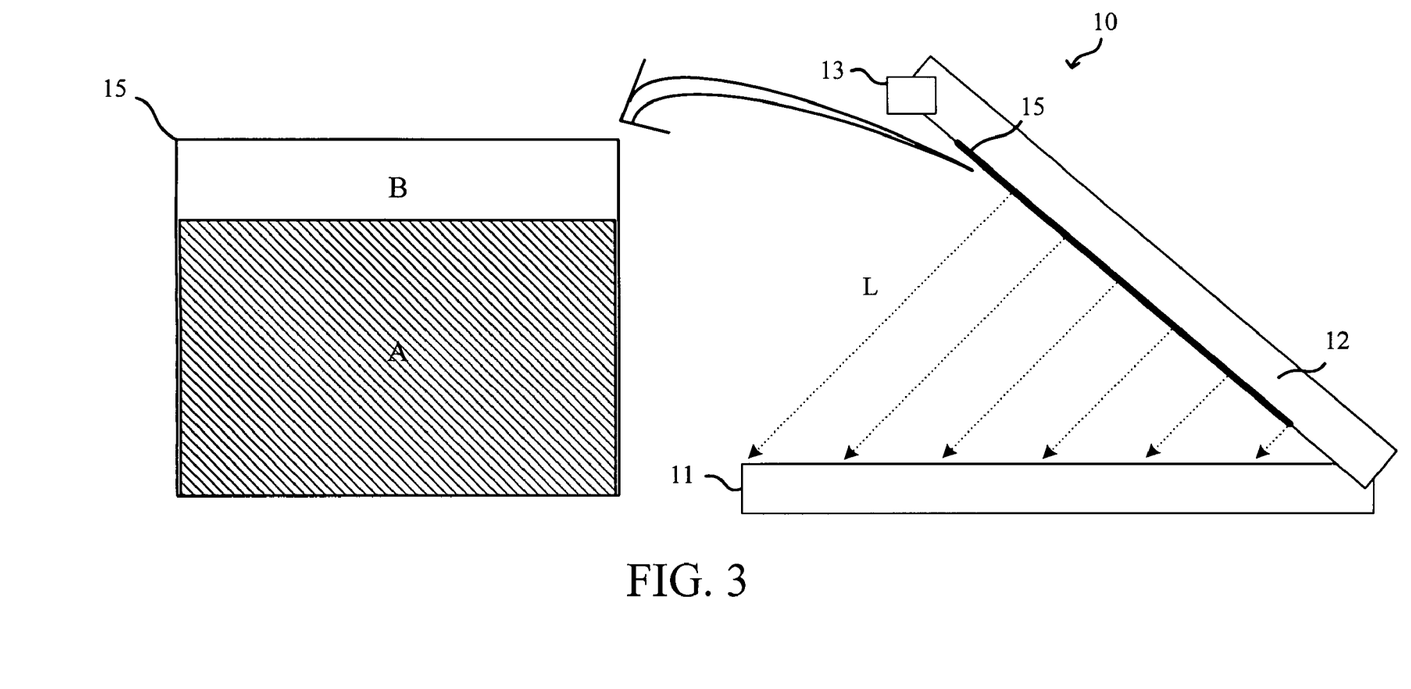
FIG. 3 shows the diagram of the effective lighting region and the non-lighting region of the panel.

The light emitted from the panel 15 is mostly perpendicular to the panel 15. According to the item size, the cover 12 rotates, and then the light emitted from some region of the panel 15 will not be projected into the positioning mark 16A or 16B of the base 11. Therefore, the so-called effective lighting region of the panel 15 means the light emitted from these regions will be projected into the positioning mark 16A or 16B. So the light must be emitted from the effective lighting region when the panel operates. And the other regions of the panel can save power by not lighting. As shown in FIG. 3, the region A is the effective lighting region, the region B is the non-lighting region and L is a light.

The second processing unit 142 is used for dividing the reference image into N second sub-regions corresponding to the N first sub-regions individually, calculating an average lightness for each of N second sub-regions respectively, and selecting a middle lightness of the reference image among the N average lightness of N second sub-regions.

The third processing unit 143 is used for judging whether the absolute value of the difference between the average lightness of each second sub-region and the middle lightness of the reference image is larger than a threshold value. By comparing the absolute value of the difference and the threshold value, it can be judged whether the lightness of the light emitted from the panel 15 is uniform or not. If the judgment of the third processing unit is yes, the uniformity of the lightness is occurred, and then the lightness of the first sub-region of the panel 15 corresponding to each of the second sub-regions is selectively adjusted. After the lightness is adjusted, the re-judgment is performed by the third processing unit 143, and the re-judgment stops until each of the absolute value of the difference between the average lightness of each second sub-region and the middle lightness of the reference image is smaller than the threshold value. By now, the light source auto-adjusting process is finished, which makes the lightness of the light radiated from the panel 15 quite uniform.

For example, the portable computer system 10 of the invention is a notebook. If a user wants to use the notebook to scan a document of an A4 size, at first, the user chooses the copy mode and the A4 size. Then, the notebook will enable the first motor 19 and the second motor 20 to actuate the cover 12 and the camera (i.e. image capturing module 13) to rotate to the correct positions corresponding to the A4 size. After the light source auto-adjusting process is performed by the lightness adjusting module 14, the lightness uniformity of the light source regions of the panel 15 can be improved.

As shown in FIG. 4, if N=16, that is to say, the effective lighting region of the panel is divided into 16 first sub-regions and the reference image is also divided into 16 second sub-regions. Each of the 16 second sub-regions corresponds to one of the 16 first sub-regions respectively.

The lightness values for all first sub-regions in the effective lighting region of the panel are firstly set as 200. Then, the average lightness values for all second sub-regions of the reference image are calculated respectively. And, a middle lightness of the reference image is selected among the 16 average lightness values of the 16 second sub-regions. Next, it is judged whether the absolute value of the difference between the average lightness of one of the second sub-regions and the middle lightness of the reference image is larger than the threshold value. In this case, the threshold value is set as 9. If the absolute value of the difference between the average lightness of the second sub-region and the middle lightness of the reference image is larger than 9, then the lightness of the first sub-region corresponding to the second sub-region is adjusted. In this case, no matter the lightness of the first sub-regions of the panel is increased or decreased, each time the lightness value is adjusted by 10. However, it is not limited by this case in practical applications.

For example, the average lightness of a second sub-region is larger than the middle lightness of the reference image, and the absolute value of the difference between them is 20. Because the absolute value of the difference between them is larger than 9, the lightness of the first sub-regions of the panel corresponding to the second sub-region is decreased by 10.

In another example, the average lightness of a second sub-region is smaller than the middle lightness of the reference image, and the absolute value of the difference between them is 15. Because the absolute value of the difference between them is larger than 9, the lightness of the first sub-regions of the panel corresponding to the second sub-region is increased by 10.

After the panel lightness auto-adjusting process is finished and some absolute values of the difference between the average lightness of the second sub-regions and the middle lightness of the reference image are still larger than 9, the panel lightness auto-adjusting process will be performed again until all of the absolute values of the difference between the average lightness of the second sub-region and the middle lightness of the reference image are smaller than 9. In this case, after performing the panel lightness auto-adjusting process seven times, the goal is finally reached.

Then, the user can depose the document of A4 size on the base after the lightness of the panel is adjusted. And, the target image related to the item is captured.

Figure 5:
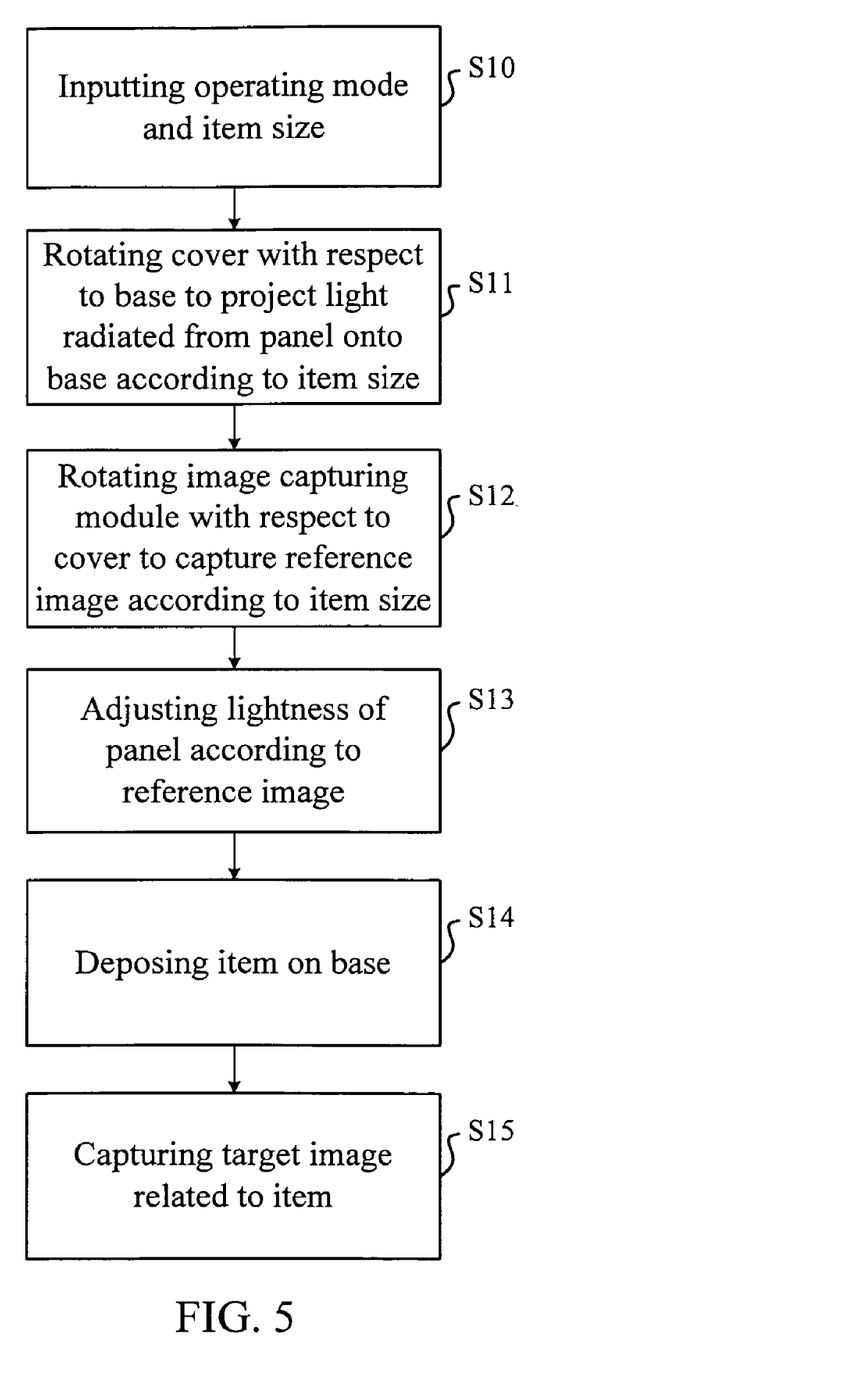
FIG. 5 shows the flowchart of the portable computer system operating method in the second embodiment according to the invention.

The second embodiment according to the invention is a portable computer system operating method. The operating method is used for operating a portable computer system to copy or scan an item. The portable computer system includes a base, a cover pivotally connected to the base, and an image capturing module pivotally connected to the cover. The cover includes a panel. Please refer to FIG. 5. FIG. 5 shows the flowchart of the portable computer system operating method in the second embodiment according to the invention.

At first, the step S10 is performed for inputting or selecting an operating mode and the size of the item. The operating mode can be a scanning mode or a copying mode. The size of the item can be an A4 size, or a B5 size. Then, the step S11 is performed for rotating the cover with respect to the base to project the light radiated from the panel onto the base according to the size of the item. Then, the step S12 is performed for rotating the image capturing module with respect to the cover to capture a reference image according to the size of the item. Afterward, the step S13 is performed for adjusting the lightness of the panel according to the reference image.

Figure 6:
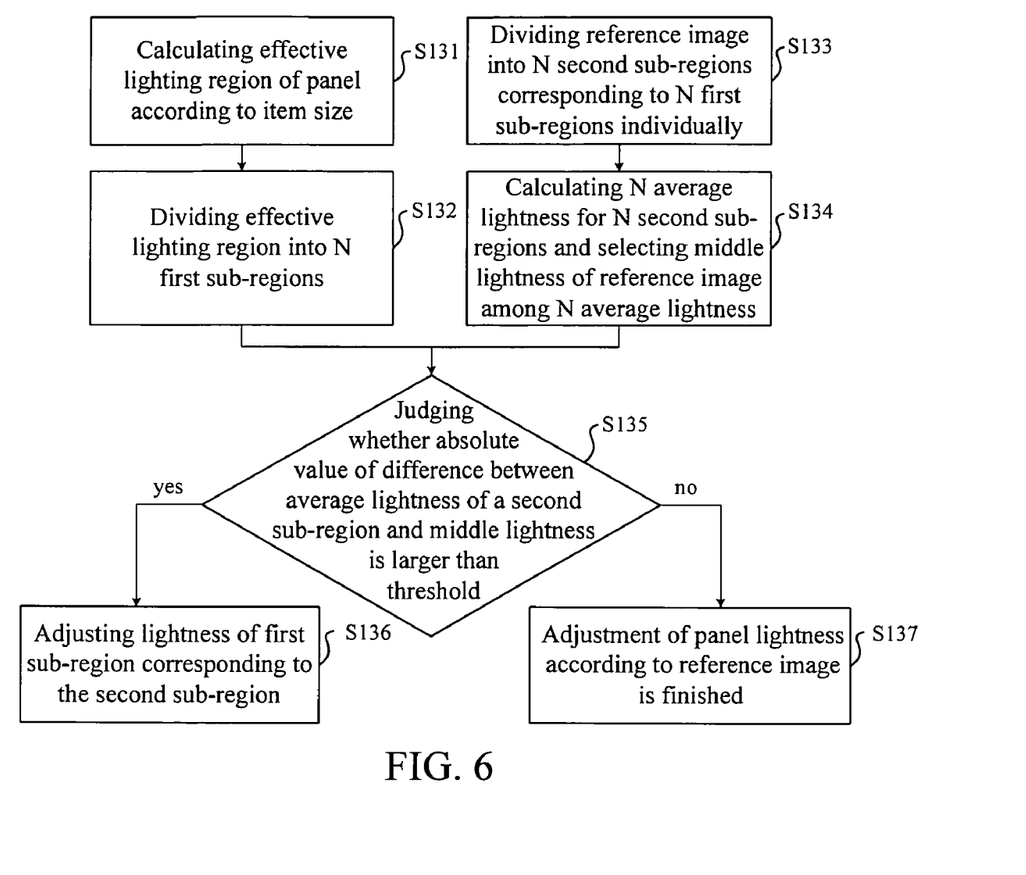
FIG. 6 shows the detail flowchart of the step S13 in the operating method shown in FIG. 5.

Please refer to FIG. 6. FIG. 6 shows the detail flowchart of the step S13 in the operating method shown in FIG. 5. As shown in FIG. 6, the step S131 is performed for calculating an effective lighting region of the panel according to the size of the item. Then, the step S132 is performed for dividing the effective lighting region into N first sub-regions. N is a positive integer. Each of the N first sub-regions has a default lightness respectively.

In addition, the step S133 is performed for dividing the reference image into N second sub-regions corresponding to the N first sub-regions individually. Then, the step S134 is performed for calculating an average lightness for each of N second sub-regions respectively and selecting a middle lightness of the reference image among the N average lightness of N second sub-regions.

Afterward, the step S135 is performed for judging whether the absolute value of the difference between the average lightness of each second sub-region and the middle lightness of the reference image is larger than a threshold value. If the judgment of the step S135 is yes, namely the absolute value of the difference between them is larger than the threshold value, the step S136 is performed for adjusting the lightness of the first sub-region corresponding to the one of the second sub-regions. On the other hand, if the judgment of the step S135 is no, namely the absolute value of the difference between them is smaller than the threshold value, the panel lightness auto-adjustment is finished.

After the panel lightness auto-adjusting process is finished and some absolute values of the difference between the average lightness of the second sub-regions and the middle lightness of the reference image are still larger than the threshold value, the panel lightness auto-adjusting process will be performed again until all of the absolute values of the difference between the average lightness of the second sub-regions and the middle lightness of the reference image are smaller than the threshold value.

Please refer to FIG. 5. After the lightness of the panel is adjusted, the step S14 is performed for deposing the item to be copied or scanned on the base. At last, the step S15 is performed for capturing the target image related to the item.

Compared to the prior art, the portable computer system according to the invention has a full image scanning function without adding any scanning apparatus. The portable computer system can not only capture an image quickly but also convert the captured image into an image file and store the image file. If the portable computer system further cooperates with a printer, the function of copying image can be achieved. Thus, the portable computer system according to the invention can save the cost of adding extra image output/input apparatuses. In addition, the cost of designing and developing the portable computer system is also saved since there is only a bit different between the design of the portable computer system according to the invention and that of general portable computer systems.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A portable computer system for capturing a target image related to an item, comprising:
    a base;
    a cover pivotally connected to the base, the cover comprising a panel projecting the light onto the base and rotating according to a size of the item;
    an image capturing module being pivotally connected to the cover and comprising a calibrator, the size of the item corresponds to the calibrator, the image capturing module rotating with respect to the cover to capture a reference image according to the size of the item; and
    a lightness adjusting module, for adjusting the lightness of the panel according to the reference image;
    wherein the image capturing module captures the target image related to the item after the lightness of the panel is adjusted.

2. The portable computer system of claim 1, wherein the base comprises an input module for inputting an operating mode and the size of the item, and the operating mode is a scan mode or a copy mode.

3. The portable computer system of claim 1, wherein the base comprises one positioning mark corresponding to the size of the item.

4. The portable computer system of claim 3, further comprising an indicator deposed on the cover and emitting an indicating light, wherein during the rotation of the cover, if the indicating light is projected onto the positioning mark, the cover stops rotating.

5. The portable computer system of claim 1, further comprising:
- a first motor, connected to the cover, for actuating the cover to rotate; and
- a second motor, connected to the image capturing module, for actuating the image capturing module to rotate.

6. The portable computer system of claim 1, wherein the lightness adjusting module comprising:
- a first processing unit calculating an effective lighting region of the panel according to the size of the item and dividing the effective lighting region into N first sub-regions, N being a positive integer, each of the N first sub-regions having a default lightness respectively;
- a second processing unit dividing the reference image into N second sub-regions corresponding to the N first sub-regions individually, calculating an average lightness for each of N second sub-regions respectively, and selecting a middle lightness of the reference image among the N average lightness of N second sub-regions; and
- a third processing unit judging whether an absolute value of the difference between the average lightness of one of the second sub-regions and the middle lightness of the reference image is larger than a threshold, and selectively adjusting the lightness of the first sub-region corresponding to the one of the second sub-regions.

7. A method of operating a portable computer system for capturing a target image related to an item, the portable computer system comprising a base, a cover pivotally connected to the base, an indicator disposed on the cover and emitting an indicating light, and an image capturing module pivotally connected to the cover, the cover comprising a panel, the operating method comprising the steps of:
- (a) rotating the cover with respect to the base to project the light radiated from the panel onto the base according to a size of the item;
- (b) rotating the image capturing module with respect to the cover until the indicating light is projected onto a positioning mark on the base, which is corresponding to the size of the item, so as to capture a reference image according to the size of the item;
- (c) adjusting the lightness of the panel according to the reference image;
- (d) deposing the item on the base after the lightness of the panel is adjusted; and
- (e) capturing the target image related to the item.

8. The portable computer system operating method of claim 7, further comprising the step of:
- inputting an operating mode and the size of the item before step (a), wherein the operating mode is a scan mode or a copy mode.

9. The portable computer system operating method of claim 7, wherein the step (c) comprises the steps of:
- (c1) calculating an effective lighting region of the panel according to the size of the item;
- (c2) dividing the effective lighting region into N first sub-regions, N being a positive integer, each of the N first sub-regions having a default lightness respectively;
- (c3) dividing the reference image into N second sub-regions corresponding to the N first sub-regions individually;
- (c4) calculating an average lightness for each of N second sub-regions respectively;
- (c5) selecting a middle lightness of the reference image among the N average lightness of N second sub-regions;
- (c6) judging whether an absolute value of the difference between the average lightness of one of the second sub-regions and the middle lightness of the reference image is larger than a threshold; and
- (c7) selectively adjusting the lightness of the first sub-region corresponding to the one of the second sub-regions according to the judgment of the step (c6).

* * * * *